Oct. 19, 1965     W. M. WILLIS     3,212,471
DIFFERENTIAL PRESSURE INDICATOR
Filed April 3, 1964
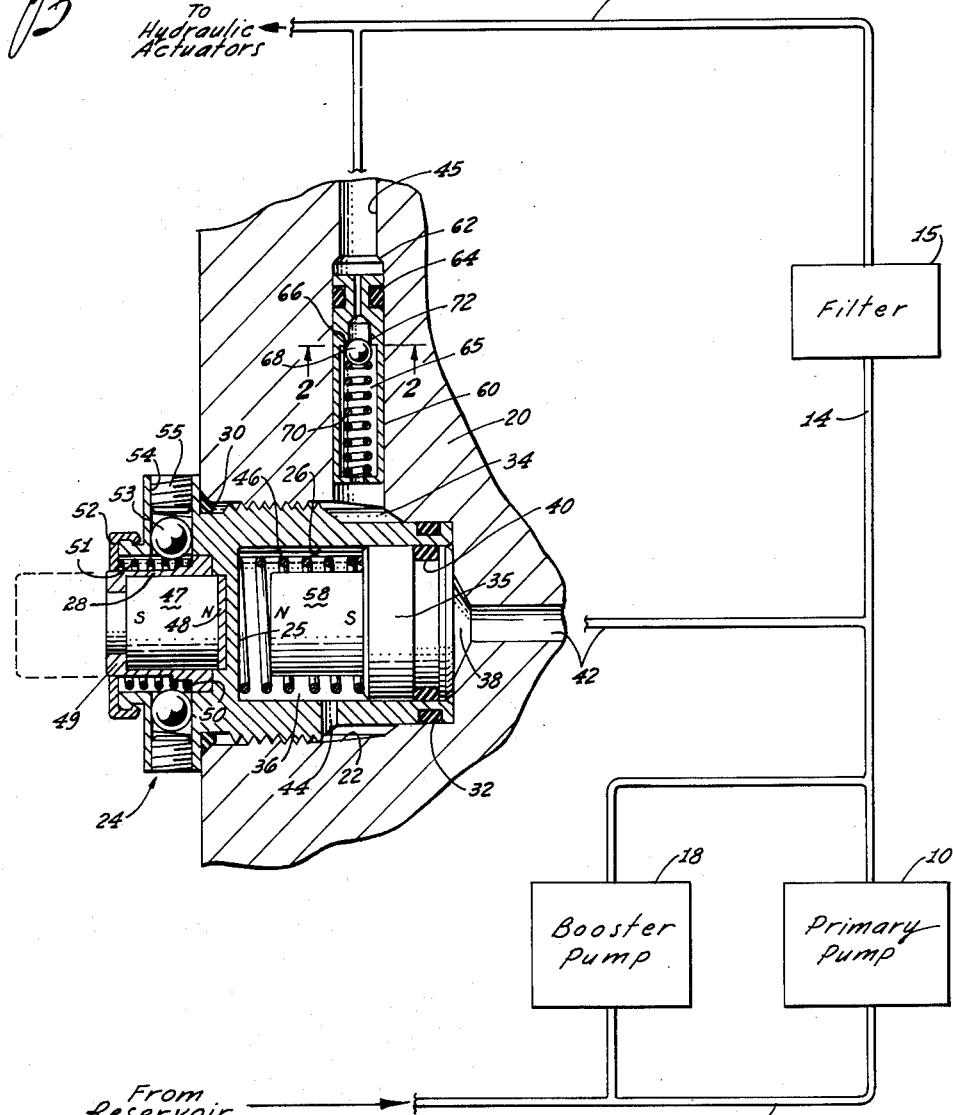
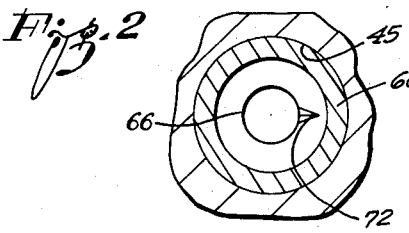
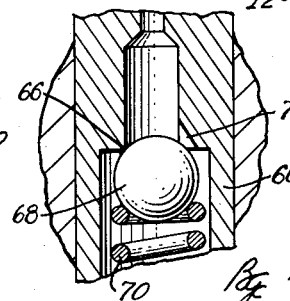
INVENTOR:
William M. Willis

United States Patent Office 3,212,471
Patented Oct. 19, 1965

3,212,471
DIFFERENTIAL PRESSURE INDICATOR
William M. Willis, Northridge, Calif., assignor to Purolator Products, Inc., New Brunswick, N.J., a corporation of Delaware
Filed Apr. 3, 1964, Ser. No. 357,185
7 Claims. (Cl. 116—70)

This invention relates to means to detect and signal changes in the pressure differential across a component in a fluid system and, more particularly, relates to such a detector wherein indicating means is actuated in response to a predetermined amount of movement of a pressure sensitive movable wall, such as a diaphragm or a piston, that divides a detector chamber into a normally high pressure compartment in communication with the upstream side of the filter and a normally low pressure compartment in communication with the downstream side of the filter. Such an indicator arrangement is commonly employed in a hydraulic system to detect clogging of a filter through which the hydraulic fluid is pumped. A simple hydraulic system of this type is commonly employed on an aircraft to actuate such devices as landing gears and various aerodynamic members.

The difficulty to which the invention is directed is that various conditons arise which create high pressure differentials across the filter when the filter is not clogged and such pressure differentials cause misleading actuation of the signaling detector. The false signals commonly lead to unnecessary investigations of the condition of the filter and even when it is known that a signal is false, it may be necessary to take time for manually resetting the signaling indicator.

One condition that may cause a false signal arises when a pressure surge or wave travels through the system, for example, when the system is first placed into operation after an idle period. Since the low pressure compartment of the indicator chamber communicates with the fluid system at a point that is substantially downstream from the point of communication of the high pressure compartment, there is a brief time period in which the pressure surge or wave is communicated only to the high pressure compartment of the detector chamber with consequent substantial shift of the movable wall.

Another condition of somewhat longer duration is created by a cold start. Since the cold hydraulic fluid has a relatively high viscosity, the resistance to flow through the filter is increased to the same degree that would result from clogging of the filter and it may take several seconds for the fluid to warm up sufficiently to restore the normal viscosity.

Still another cause of false indications arises when the booster pump operates. In many hydraulic systems temporary peak loads occur at certain times which require more than the usual pump capacity and at such a time an auxiliary booster pump is energized for several seconds to share the load. Such a peak load occurs, for example, at the takeoff of an airplane when several hydraulic components must be actuated simultaneously.

A still further cause of false indications occurs when the piston or diaphragm is subjected to a high G force. Such a force is usually of very brief duration but may be adequate to cause as great a shift of the piston or diaphragm as would result from a clogged filter.

The present invention avoids these difficulties by, in effect, making the indicator immune to pressure differentials of relatively short duration. For this purpose the invention provides means to restrict the displacement flow of the hydraulic fluid from the low pressure compartment of the indicator when a high pressure differential occurs thereby to retard the responsive movement of the piston or diaphragm to delay actuation of the indicator until the temporary condition ceases. It is desirable, however, that adequate freedom of flow exist in the other direction at all times.

Accordingly, the invention provides two paths of flow communication between the low pressure compartment and the downstream side of the filter. One path of ample flow capacity is provided with a check valve that blocks flow in the direction from the low pressure compartment to the downstream side of the filter. The other path of flow is a bypass around the check valve that is restricted to provide a time delay of sufficient duration to make the indicator immune to transient conditions.

In putting this concept into practice, a certain problem arises in that a flow passage that is sufficiently restricted to serve the purpose of the invention is too easily clogged up. It is highly probable that clogging of a fine bypass will occur sooner or later to make the indicator completely inoperative.

The invention solves this problem by, in effect, combining the two flow passages so that the restricted passage is flushed out by reverse flow whenever such reverse flow occurs from the downstream side of the filter to the low pressure compartment. The two passages are combined by employing a check valve for the larger passage and by providing a notch in the check valve seat to serve as the restricted passage. In the preferred practice of the invention the check valve comprises a valve seat and a cooperating spring-pressed valve member in the form of a ball.

The flow capacity of the notch in the valve seat must be exceedingly small. In the usual hydraulic system the notch must have an effective flow area within the range from .0000002 to .000075 square inch and it is a problem to make such a small notch economically with the required accuracy. The invention solves this problem by forming the notch by an etching process. Such a process lends itself to close control to make possible repetitive production of notches of closely predetermined dimension. A further feature of the invention is to concept of providing such a check valve in the form of an easily replaceable capsule. The capsule is slidably mounted in the passage between the low pressure compartment and the downstream side of the filter and is surrounded by a suitable annular seal to prevent longitudinal flow past the capsule.

The invention not only meets the above mentioned difficulties but also specific requirements for delay in the indicating of an excessive pressure differential. For example, one indicating unit may signal with a minimum delay of one second and a maximum delay of ten seconds. A second unit may signal within a time range of not less than 10 seconds and not more than 30 seconds.

The features and advantages of the invention may be understood from the following detailed description and the accompanying drawing.

In the drawing which is to be regarded as merely illustrative:

FIG. 1 is a view illustrating the presently preferred practice of the invention, the view being partly sectional and partly diagrammatical;

FIG. 2 is an enlarged cross section of the replaceable capsule seen along the line 2—2 of FIG. 1, the view showing in exaggerated manner where the notch may be provided in the valve seat; and FIG. 3 is a cross-sectional view indicating the character of a notch in a valve seat that serves as a bypass.

FIG. 1 shows diagrammatically a typical hydraulic system having a primary pump 10 connected on its intake side by a passage means 12 with a suitable reservoir (not shown) containing hydraulic fluid and connected on its output side by passage means 14 to a suitable filter 15. A passage means 16 connects the downstream side of the filter 15 to various remotely controlled hydraulic actuators (not shown). For the purpose of meeting peak loads a suitable booster pump 18 is incorporated in the system in parallel with the primary pump 10.

In the usual arrangement the filter 15 which is shown diagrammatically in FIG. 1, is housed in a filter case (not shown) that is removably mounted on a filter head assembly and the means to indicate clogging of the filter is incorporated in the filter head assembly. FIG. 1 shows a portion of a casting 20 which forms at least a part of such a filter head assembly.

The casting 20 has a threaded bore 22 in which is mounted a removable screw-threaded indicator body 24 of nonmagnetic material, the indicator body having an intermediate transverse wall 25 that divides the interior of the body into an inner cylinder 26 and an outer cylinder 28. Suitable O-rings 30 and 32 are provided at opposite ends of the indicator body 24 to seal off an annular space 34 in the bore 22 that surrounds the indicator body. The inner cylinder 26 cooperates with the cavity 22 to form a chamber which is divided by a movable wall 35 into a low pressure compartment 36 and a high pressure compartment 38.

In the construction shown, the movable wall 35 is in the form of a free piston that is embraced by a suitable O-ring 40. The high pressure compartment 38 is connected by a passage means 42 to the previously mentioned passage means 14 on the upstream side of the filter 15. To connect the low pressure compartment 36 with the downstream side of the filter 15, a radial bore 44 in the indicator body 24 communicates with the annular space 34 and a radial bore 45 in the casting 20 places the annular space in communication with the previously mentioned passage means 16 on the downstream side of the filter 15.

With the piston 35 preloaded or biased by a coil spring 46 in the low pressure compartment 36, it is apparent that the normally low fluid pressure in cooperation with the spring will act on one side of the piston to oppose the high fluid pressure on the other side of the piston and that the piston will yield at a predetermined pressure differential between the low pressure chamber and the high pressure chamber by moving leftward as viewed in FIG. 1 in response to a rise in the pressure differential across the piston. The force required to move the piston is a function of the piston face area exposed to pressure and the spring force applied to oppose the high pressure fluid.

Within the scope of the invention any suitable indicating means may be provided that responds to a predetermined magnitude of leftward movement of the piston 35. In the construction shown, the indicating means includes a button 47 in the form of a permanent magnet of the configuration of a solid cylinder which is slidingly mounted in the outer cylinder 28 and which is normally in a retracted non-signaling position shown in solid lines in FIG. 1.

The permanent magnet 47 is normally held by magnetic attraction at a position in abutment with a fixed ferromagnetic disk 48 which serves as a fixed pole piece. The permanent magnet 47 is encased in an aluminum jacket 49 which preferably is colored red and which is formed with a peripheral shoulder 50 to seat one end of a light coil spring 51. The coil spring 51 acts under compression between an apertured cap 52 of nonmagnetic material and the shoulder 50 to bias the signal button or permanent magnet 47 inwardly.

To serve as detent means to keep the signal button extended in a yielding manner, two diametrically oppositely positioned balls 53 of ferromagnetic material are mounted in corresponding radial bores 54 with the outer ends of the bores closed by screw plugs 55. Whenever the signal button or permanent magnet 47 is shifted outwardly to the extent that the aluminum jacket 49 clears the two balls 53, the permanent magnet attracts the two balls inwardly to positions at which the two balls block the return path of the jacket. The signal button may be returned to its normal inner position by manual pressure sufficient to cause the inner end of the aluminum jacket to cam the two balls 53 outward to their normal positions.

Fixedly mounted on the face of the piston 35 is a second and stronger permanent magnet 58 of the configuration of a solid cylinder. The two permanent magnets 47 and 58 are of opposite polarity as indicated by the letters N and S so that they mutually repel each other. With the moving parts positioned as shown in FIG. 1, leftward movement of the piston 35 shifts the permanent magnet 58 towards the permanent magnet 47 and at a predetermined point in the approach of the permanent magnet 58 to the permanent magnet 47, the magnetic field of the permanent magnet 58 overcomes the attraction of the permanent magnet 47 for the ferromagnetic disk 48 and repels the permanent magnet 47 with sufficient force to overcome the light spring 51.

All of the structure described to this point is old in the art except for the indicating means incorporating the two permanent magnets 47 and 58, which indicating means is a separate invention described and claimed in a separate patent application. The improvement afforded by the present invention is embodied in a capsule or cylindrical valve body 60 that is removably mounted in the bore 45. Preferably the bore 45 is formed with a circumferential shoulder 62 that faces towards the low pressure chamber 36 to serve as a stop to limit the axial movement of the capsule. A suitable O-ring 64 acts between the capsule and the surrounding wall of the bore 45 to prevent leakage of the hydraulic fluid past the periphery of the capsule and in the construction shown this O-ring is carried by the capsule.

The capsule 60 has an axial passageway 65 for the flow of fluid therethrough and the passageway is formed with a valve seat 66 for a check valve member in the form of a ball 68. The ball is biased towards its closed position against the valve seat by means of a suitable coil spring 70. As indicated in an exaggerated manner in FIG. 2, the valve seat 66 is formed with a small recess or notch 72 that serves as the required restricted bypass. The notch 72, which is preferably produced by an etching process, is best shown in FIG. 3 and is of a dimension to provide an effective flow area within the range of .0000002 to .000075 square inch.

The manner in which the invention functions for its purpose may be readily understood from the foregoing description. When the pressure differential across the filter is normal the piston 35 is in its normal rightward position shown in FIG. 1. When the pressure differential rises above a predetermined magnitude that is governed by the spring 46 the piston 35 shifts to the left as viewed in FIG. 1 by a sufficient distance to cause the signal button 47 to move to its outer signaling position. It is apparent for the piston 35 to make this shift a corresponding volume of hydraulic fluid must be displaced from the low pressure chamber 36 through the capsule 60 to the low pressure side of the filter 15. Since the spring 70 biases the valve ball 68 to its closed position and the displacement flow is towards the closed position of the valve ball, the valve ball seats to limit the displacement flow to the amount of fluid that can pass through the notch 72 in the valve seat 66. This bypass flow is greatly restricted and consequently the leftward movement of the piston 35 is so retarded that it takes several seconds for the piston to shift far enough to actuate the signal button 47. By correct proportioning of the bypass orifice, a predetermined time delay varying generally from one to thirty seconds may be accomplished. If some unusual condition should cause rapid clogging of the filter 15, the signal button 47 would be actuated after a time delay of acceptable duration. Usually, however, a filter clogs up gradually and accordingly the piston 35 keeps up with the gradually rising pressure differential and causes the signal button to operate substantially as soon as the predetermined critical pressure differential is established.

Once the signal button 47 is latched at its outer position by the two balls 53, it may be returned by manual pressure sufficient to cam the two balls back to their normal outer positions.

When the system is first started up with consequent creation of a pressure surge through the system the pressure surge is sensed by the high pressure cylinder before it is sensed by the low pressure cylinder but the resulting pressure differential across the piston is of relatively short duration and terminates before the retarded piston reaches its signaling position. If the hydraulic fluid is cold when the system starts up, the resulting high viscosity of the fluid causes the filter to impede the flow in much the same manner as if the filter were clogged but the fluid warms up in a few seconds and the pressure differential disappears before the retarded piston reaches its signaling position.

When the booster pump 18 is cut into the system to meet a peak demand the pressure differential may rise excessively but the notch 72 is dimensioned to cause sufficient retardation of the piston movement to keep the piston from reaching its signaling position before the booster pump is deenergized. In like manner it is apparent that if the piston 35 is subjected to a high G force the resulting shift of the piston will be retarded sufficiently to avoid the creation of a false signal.

An important advantage of providing a bypass in the form of the notch 72 in the valve seat 66 is that the notch is flushed out every time the valve ball 68 is unseated. In fact, since the notch forms a continuously open bypass, the notch will be flushed out by reverse flow therethrough whenever a reversal of the pressure differential occurs even when it is insufficient to overcome the spring 70.

My description in specific detail of the selected embodiment of the invention will suggest various changes, substitutions and other departures from my disclosure within the spirit and scope of the appended claims.

I claim:

1. In a fluid system wherein fluid from a high pressure source passes through a component such as a filter and wherein means to indicate clogging of the component is responsive to a predetermined length of movement of a pressure sensitive wall that divides a detector chamber into a normally high pressure compartment in communication with the upstream side of the component and a normally low pressure compartment in communication with the downstream side of the component, an improvement to make the indicating means non-responsive to transient high pressure differentials across the component arising from such causes as delayed establishment of a steady state condition when flow through the system is initiated, temporary high viscosity of the fluid on a cold start, and temporary boosting of pressure at the source to meet a peak demand, said improvement comprising:
    means providing two paths of flow communication between the downstream side of the component and the low pressure compartment; and
    means blocking flow along one of the two paths from the low pressure compartment while permitting free flow to the low pressure compartment,
    the other of the two paths of flow communication being restricted to retard flow to the low pressure side of the component of fluid displaced by the pressure sensitive wall to retard movement of the wall to delay actuation of the indicating means when a high pressure differential occurs across the wall, said other of the two paths being continuously open for free fluid flow in opposite directions for flushing out clogging material therein.

2. In a fluid system wherein fluid from a high pressure source passes through a component such as a filter and wherein means to indicate clogging of the component is responsive to a predetermined length of movement of a pressure sensitive wall that divides a detector chamber into a normally high pressure compartment in communication with the upstream side of the component and a normally low pressure compartment in communication with the downstream side of the component, an improvement to make the indicating means non-responsive to transient high pressure differentials across the component arising from such causes as delayed establishment of a steady state condition when flow through the system is initiated, temporary high viscosity of the fluid on a cold start, and temporary boosting of pressure at the source to meet a peak demand, said improvement comprising:
    a check valve between the low pressure compartment and the downstream side of the component to block fluid flow from the low pressure compartment while permitting flow to the low pressure compartment; and
    a bypass around the check valve, said bypass being restricted to retard displacement of fluid from the low pressure compartment to retard movement of the movable wall when the pressure differential rises across the wall, said bypass being continuously open for free flow in opposite directions for reverse flushing action on foreign material therein.

3. An improvement as set forth in claim 2 in which said check valve comprises a valve seat member and a valve member biased towards the valve seat member; and
    in which said bypass is a recess in one of the two members to permit restricted flow through the valve seat member when the valve member is seated.

4. An improvement as set forth in claim 3 in which said recess has an effective flow area in the range of .0000002 to .000075 square inch.

5. In a fluid system wherein fluid from a high pressure source passes through a component such as a filter and wherein means to indicate clogging of the component is responsive to a predetermined length of movement of a pressure sensitive wall that divides a detector chamber into a normally high pressure compartment in communication with the upstream side of the component and a normally low pressure compartment connected by a passage with the downstream side of the component, an improvement to make the indicating means non-responsive to transient high pressure differentials across the component arising from such causes as delayed establishment of a steady state condition when flow through the system is initiated, temporary high viscosity of the fluid on a cold start, and temporary boosting of pressure at the source to meet a peak demand, said improvement comprising:
    a valve body removably mounted in said passage for full control of flow therethrough, said valve body forming a valve seat facing towards the low pressure compartment with a passageway through the valve seat;
    a valve member in the valve body positioned towards the low pressure compartment from the valve seat;

spring means in the valve body urging the valve member towards the valve seat to block flow from the low pressure compartment to the downstream side of the component; and a recess in said valve seat serving as a bypass when the valve member is seated and to restrict the bypass flow to retard movement of the pressure sensitive wall when the pressure differential rises across the wall.

6. An improvement as set forth in claim 5 in which said passage is of circular cross section and said valve body is of cylindrical configuration to seat into the passage.

7. An improvement as set forth in claim 6 in which said passage is formed with a shoulder facing towards the low pressure compartment, said valve body being slidable into the passage against the shoulder; and in which annular sealing means surrounds the valve body to prevent leakage past the valve body.

References Cited by the Examiner

UNITED STATES PATENTS

| | | | |
|---|---|---|---|
| 2,843,077 | 7/58 | Leefer | 116—117 |
| 2,942,572 | 6/60 | Pall | 116—70 |
| 3,125,062 | 3/64 | Raupp et al. | 116—117 |

LOUIS J. CAPOZI, *Primary Examiner.*